United States Patent Office 3,659,017
Patented Apr. 25, 1972

3,659,017
SAFENING AGENTS FOR DINITROPHENOLS AND THEIR DERIVATIVES
William C. von Meyer, Willow Grove, Pa., assignor to Rohm and Haas Company, Philadelphia, Pa.
No Drawing. Continuation-in-part of application Ser. No. 648,995, June 26, 1967. This application Sept. 23, 1969, Ser. No. 860,412
Int. Cl. A01n 9/20
U.S. Cl. 424—326     5 Claims

ABSTRACT OF THE DISCLOSURE

The phytotoxicity of pesticidal formulations containing dinitrophenols, or their derivatives, is reduced on host crop plants, such as cucurbits, grapes, beans and tomato by adding to the formulation safening agents selected from a thiourea, a thiuronium salt, a tetrazolium salt, and certain imidazolines. The safening agents prevent internal tissue damage in growing plants caused by the dinitrophenols and derivatives without reducing their fungicidal activity.

---

This application is a continuation-in-part of U.S. Ser. No. 648,995, filed June 26, 1967, now abandoned.

This invention relates to safening a host crop plant against injury caused by pesticidal formulations that are applied to the locus of the host plant and particularly to the foliage of the host plant in order to control certain pathogens and insects that cause the host plant to become diseased. Many of these pesticides injure the host plant slowing its growth and development. The invention further relates to the novel use of certain chemical compounds for the prevention of injury inside a host plant caused by the external application of chemical pesticides to the locus of the host plant. More particularly, this invention relates to the novel use of safening compounds for the prevention of injury to plant tissues caused by the application of dinitrophenols, or their derivatives, contained in foliar spray formulations.

Dinitroalkylphenols and other substituted-dinitrophenols are useful as pesticides. Their use, however, entails a serious disadvantage because they may produce an unacceptable level of injury to plants. This prevents the wide use of simple nitrophenols, moreover, certain of their esters useful as foliar fungicides and insecticides may sometimes also show objectionable phytotoxicity, particularly at high temperatures.

Attempts at reducing the injury to the plants caused by the external application of chemicals have thus far been limited to controlling factors external to the plant's tissues. Some of the prior art attempts include: a reduction of the dosage of active material per unit area on the plant surface; the use of spreading agents which prevent the toxicant from aggregating on small areas of the plant surface; manipulation of pH in order to maintain an anionic form rather than the neutral form of the toxicant on the plant's surface. The prior art methods have entailed certain serious disadvantages. For example, a loss in maximum useful amount of biological activity often accompanies the reduction in injury to the plant.

Additional prior art attempts at safening dinitrophenols include: the use of walnut shells and finely-ground redwood bark as carrier materials for dinitrophenols (see U.S. Pats. 2,166,121 and 2,166,122); the formation of cyclohexyl amine addition salts of 2,4-dinitrosubstituted phenols which are less injurious to plants than the free phenol (see U.S. 2,225,619); the mixing of an inert diluent with an amine salt of a dinitrophenol to provide an even safer pesticidal composition (see U.S. 2,365,056); the incorporation of methyl cellulose to amine salts of dinitroalkylphenols to reduce injury to citrus fruits from that of commercially objectionable levels to a safe level (see U.S. 2,745,782).

In accordance with this invention injury to plant tissues caused by the external application of pesticidal formulations containing dinitrophenols, or their derivatives, has been effectively reduced by the addition of certain safening agents to the pesticidal formulation. It has been discovered that tissue damage in growing plants caused by the external application of the substituted dinitrophenol formulations can be reduced up to about ninety-five percent by incorporating into the formulation at least one compound (referred to hereinafter as safening agent) selected from (a) 1-cyclohexyl-3-(2-morpholinyl-(4)-ethyl)-thiourea,
(b) S-t-octylcresoxyethoxyethyl-N,N'-dimethyl-thiuronium chloride,
(c) 2,3,5-triphenyltetrazolium chloride,
(d) 2-tetradecylmercapto-Δ²-imidazoline hydrobromide,
(e) 2-cetylmercapto-Δ²-imidazoline hydrobromide,
(f) 1-acetyl-2-benzylmercapto-Δ²-imidazoline, and
(g) 2-(β-hydroxyethylmercapto)-Δ²-imidazoline hydrochloride.

These safening agents are either products of commerce or may be made by the methods given below:

(a) 1-cyclohexyl-3-(2-morpholinyl - (4) - ethyl)-thiourea is commercially available from Aldrich Chemical Co., Inc., Milwaukee, Wis.
(b) S-t-octylcresoxyethoxyethyl - N,N' - dimethylthiuronium chloride was prepared by the following reaction

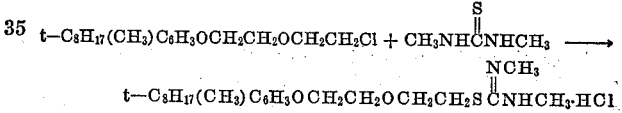

A mixture of 94% pure t-octylcresoxyethoxyethyl chloride (170 g., 0.49 mole, made by reaction of sodium t-octylcresolate with bis(β-chloroethyl)ether), dimethylthiourea (60 g., 0.58 mole) and toluene (100 ml.) was heated at reflux temperature with stirring for 45 hours. The toluene was then removed leaving a thick red oil residue of 210 g. This was found by analysis to contain 6.8% N and 7.63% HCl; calculated for $C_{22}H_{34}ClN_2O_2S$ is 6.5% N and 8.5% HCl. The product was a quantitative weight yield of S-t-octylcresoxyethoxyethyl-N,N'-dimethylthiuronium chloride.

(c) 2,3,5-triphenyltetrazolium chloride is commercially available from Distillation Products Industries, Rochester, New York.
(d) 2-tetradecylmercapto-Δ² - imidazoline hydrobromide was prepared by the following reaction

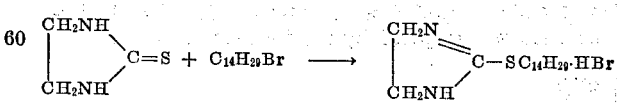

A mixture of ethylene thiourea (11 g., 0.18 mole), myrestyl bromide (30 g., 0.18 mole) and ethanol (50 ml.) was heated under reflux for 15 hours. The solvent was removed under reduced pressure to give 41 g. of a colorless, waxy solid which melted at 140–144° C. This was found by analysis to contain 7.5% N; calculated for $C_{17}H_{35}BrN_2S$ is 7.4% N. The product was a quantitative yield of 2-tetradecylmercapto-Δ²-imidazoline hydrobromide.

(e) 2-cetylmercapto-Δ²-imidazoline hydrobromide was prepared by the following reaction

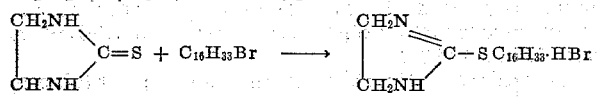

A mixture of ethylene thiourea (21 g., 0.23 mole), cetyl bromide (60 g., 0.196 mole) and ethanol (200 ml.) was heated at reflux for 4.5 hours. The solvent was removed under reduced pressure to give a solid which was washed with acetone and air dried. The product was 61 g. of white solid melting at 92–94° C. This was found by analysis to contain 6.9% N; calculated for $C_{19}H_{29}BrN_2S$ is 6.9% N. The product was a 75% yield of 2-acetylmercapto-Δ²-imidazoline hydrobromide.

(f) 1-acetyl-2-benzylmercapto-Δ²-imidazoline was prepared by the following series of reactions

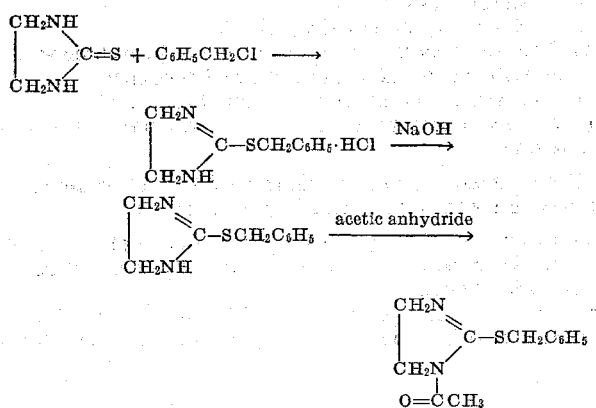

A reaction mixture consisting of ethylene thiourea (51 g., 0.5 mole), benzyl chloride (63 g., 0.5 mole) and ethanol (300 ml.) was heated at reflux temperature for 3 hrs. then concentrated to give 150 g. of syrup. To this was added 50 ml. of 2 N-HCl in 250 ml. of water and most of the syrup dissolved. The mixture was extracted with benzene and the aqueous layer was neutralized with 325 ml. of 2 N-NaOH. The resulting solid was filtered off, washed with water and oven dried to give 80 g. melting at 64–65° C. This was an 83% yield of 2-benzylmercapto-Δ²-imidazoline.

To 2-benzylmercapto-Δ²-imidazoline (38.5 g., 0.2 mole) was added acetic anhydride (51 g., 0.5 mole). An exothermic reaction resulted in a solution. Benzene (25 ml.) was added and the solution cooled to give a solid which was recrystallized from methanol (50 ml.) to give 23 g. of white solid melting at 117–118° C. The reaction filtrate was concentrated to give 20 g. of residue which was recrystallized from the above methanol filtrate to give 15 g. of solid melting at 113–116° C. These products amounted to an 80% yield of 1-acetyl-2-benzylmercapto-Δ²-imidazoline.

(g) 2-(β-hydroxyethylmercapto)-Δ²-imidazoline hydrochloride was prepared by the following reaction

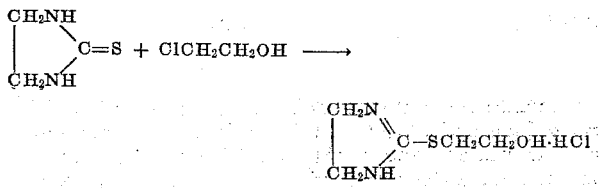

A reaction mixture consisting of ethylene thiourea (102 g., 1 mole) and ethylene chlorohydrin (80.5 g., 1 mole) was heated on a steam bath for 4.5 hrs. Ethanol (200 ml.) was added to give a white solid which was removed by filtration and amounted to 61 g. The filtrate was concentrated to give 91 g. of yellow syrup and this was found to contain by analysis 16.1% N; calculated for $C_5H_{11}ClN_2OS$ is 15.4% N. The syrup is a 50% yield of 2-(β-hydroxyethylmercapto)-Δ²-imidazoline hydrochloride.

The safening agents of this invention are incorporated into the substituted-dinitrophenol formulation in a weight ratio of safening agent to dinitrophenol, or derivative, of from about 1:12 to about 3:1; a range of from about 1:4 to about 1.5:1 is preferred. The amount of safening agent required to reduce or eliminate the injury caused by the dinitrophenols varies with the particular dinitrophenol, the particular safening agent and the host plant. Therefore, the amount of safening agent needed to reduce the injury to a commercially acceptable level on sensitive crops will depend upon the particular circumstances. The mechanism by which the internal safening agents of this invention operates is not understood because the host plant may act on the chemical compounds that are introduced into it. As soon as the safening agent enters the plant it is subject to the plant's metabolic system. Therefore, it cannot be stated with any degree of certainty that the exact structure introduced into the plant is responsible for the safening effect.

The safening agents of this invention permit the exposure of extremely sensitive plants to dinitrophenols, or their derivatives. For example, it may now be possible for cucurbits and certain fruits to obtain insecticidal benefits from simple dinitrophenols. In addition, it is now possible to use higher dosages of the dinitrophenols that were formerly phytotoxic, and certain commercial pesticides may now be used in applications that were formerly impossible because of crop injury.

An important aspect of this invention is that the above defined safening agents prevent internal tissue damage in growing plants caused by the external application of biocidal formulations containing dinitrophenols without significantly reducing their pesticidal activity. In addition, the safening agents are themselves non-toxic at effective rates of application.

The present invention is applicable to substituted dinitrophenols and their esters wherein the phenol is represented by the formula:

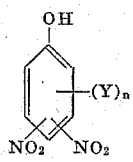

wherein n is 1 or 2 and Y is an alkyl group having up to 16 carbon atoms with the proviso that when n is 2, the 2 alkyl groups shall total no more than 24 carbon atoms, cycloalkyl, isobornyl, phenyl and benzyl. The nitro groups are preferably in any two of the 2, 4 and 6 positions so that when n is 2, it is preferred that at least one of the Y substituents be in the 3 or 5 position. It is preferred to use compounds characterized by the above formula wherein Y is alkyl and it is most preferred to use dinitrophenols wherein Y is alkyl, n is 1 and the nitro groups are in any two of the 2, 4 and 6 positions. The nature of the ester group is not critical for purposes of this invention and any acid or acid precursor taught by the art as giving a biologically useful ester may be used. The most widely used esters are the alkanoates as the acetates; the alkenoates as the crotonates and 3-methyl-2-butenoates; and the carbonates as the $C_1$ to $C_6$ alkyl carbonates.

The compounds as described above have long been known to be outstanding biocides. However, the phenols are also generally characterized by an accompanying phytotoxicity which limits their usefulness on plants. It is believed that the phytotoxicity of the free phenols is associated with the presence of the phenolic hydroxyl group and that, insofar as the esters of the phenols display phytotoxicity, the property is caused by the presence of a minor amount of the free phenol as possibly by the hydrolysis of the ester under use conditions. Thus, while the biocidal effectiveness of the compounds is largely determined by the nature and position of the substituent groups in the dinitrophenol, the phytotoxicity of the compound is primarily determined by the presence of the phenolic hydroxyl group. The compounds described herein as safening agents have been found to significantly reduce the phytotoxicity of the substituted-dinitrophenols and their esters described herein irrespective of the nature of the substituent groups. The following compounds are representative substituted dinitrophenols: 2,4 - dinitro-6-sec. butylphenol, dinitrocaprylphenol, 2 - i-bornyl-4,6-dinitrophenol, 2,4-dinitro-6-($C_1$-$C_9$)alkyl phenols such as 2,4-dinitro - 6-nonylphenol, 2,6-dinitro-p-cresol, 2,6-dinitro-4-(1-ethylhexyl)phenol, 2,4-dinitro-6-(1-ethylhexyl)phenol, 2,4 - dinitro-6-(1-methylheptyl)phenol, 2,6-dinitro-4-(1-methylhexyl)phenol, 2,6 - dinitro-4-(1-propylpentyl)phenol, 2,6-dinitro-4-($C_1$-$C_{12}$)alkyl phenols, 2,4-dinitro-3,5-dimethylphenol, 2,4-dinitro-3-methyl-6-dodecylphenol, 2,4 - dinitro-6-cyclopropyl-phenol, 2,4-dinitro-6-cyclobutyl-phenol, 2,6 - dinitro-4-cyclopentylphenol, 2,4 - dinitro-6-cyclohexylphenol, 2,4-dinitro-6-phenylphenol and 2,4-dinitro-6-benzylphenol. By reason of the proven utility as agriculturally useful toxicants of the above listed dinitrophenols and the esters thereof, such as the acetates, crotonates, 3-methyl-2-butenoates and alkyl carbonates, combinations of these compounds with the safening agents of the invention are particularly useful.

To assist those skilled in the art to practice the present invention, the following procedures are suggested by way of illustration parts and percentages being by weight unless otherwise specifically noted.

(1) Nine foliar spray formulations were prepared.

Formulation A contained 400 p.p.m. dinitrocaprylphenol (DNCP), 150 p.p.m. 1-(cyclohexyl)-3-(2-morpholinyl-(4)-ethyl)-thiourea (CMT) and a carrier consisting of 25 weight percent methanol, 25 weight percent acetone, 49 weight percent water and 1 weight percent glycerin. The other formulations described below contained the same carrier.
Formulation B contained 400 p.p.m. DNCP and 150 p.p.m. 2-tetradecylmercapto-$\Delta^2$-imidazoline hydrobromide (TIHB).
Formulation C contained 400 p.p.m. DNCP and 150 p.p.m. S-t-octylcresoxyethoxyethyl - N,N'-dimethylthiuronium chloride (S–OCEDTC).
Formulation D contained 400 p.p.m. DNCP and 150 p.p.m. 2 - cetylmercapto-$\Delta^2$-imidazoline hydrobromide (CIHB).
Formulation E contained 400 p.p.m. DNCP and 150 p.p.m. 2,3,5-triphenyl tetrazolium chloride (TTC).
Formulation F contained 400 p.p.m. DNCP and 150 p.p.m. 1-acetyl - 2 - benzylmercapto - $\Delta^2$ - imidazoline (ABMI).
Formulation G contained 400 p.p.m. DNCP and 150 p.p.m. 2-(β-hydroxyethylmercapto-$\Delta^2$-imidazoline hydrochloride (BHMIH).
Formulation H consisted solely of 400 p.p.m. DNCP in the same carrier described for the other formulations.

The formulations were separately sprayed onto nine tomato seedling plants which were about 4 weeks old. The sprayed plants were dried under ambient conditions, placed in the controlled environment of a greenhouse and maintained at about 20–25° C. for about 4 days. The plants were then observed for injury in the form of chemically produced lesions. The injury was reported as either slight, moderate, or severe. The results of the tests are given in Table I below.

TABLE I

| Formulation: | Injury |
|---|---|
| A | Slight. |
| B | Do. |
| C | Do. |
| D | Do. |
| E | Do. |
| F | Do. |
| G | Do. |
| H | Severe. |

It can be seen from Table I that the tomato plants sprayed with the formulations containing the safening compounds of this invention were only slightly injured; while the plants sprayed with the formulation containing dinitrocaprylphenol without a safening compound were severely injured.

(2) Seven foliar spray formulations were prepared. Each formulation contained the same carrier described in procedure (1) above.

Formulation I contained 400 p.p.m. 2-nonyl-4,6-dinitrophenol (DNNP).
Formulation J contained 400 p.p.m. DNCP.
Formulation K contained 400 p.p.m. DNCP and 150 p.p.m CMT.
Formulation L contained 400 p.p.m. DNCP and 150 p.p.m CMT.
Formulation M contained 400 p.p.m. DNCP and 150 p.p.m. CIHB.
Formulation N contained 400 p.p.m. DNCP and 150 p.p.m. TIHB.
Formulation O contained 400 p.p.m. DNCP and 150 p.p.m. S–OCEDTC.

The formulations were separately sprayed onto the leaves of seven cucumber plants and tested in accordance with the method described in procedure (1) above. The results of the tests are given in Table II below.

TABLE II

| Formulation: | Injury |
|---|---|
| I | Severe. |
| J | Do. |
| K | Slight. |
| L | Do. |
| M | Do. |
| N | Do. |
| O | Do. |

It can be seen from Table II that the cucumber plants sprayed with foliar formulations containing a dinitroalkylphenol without a safening compound were severely injured; while the plants sprayed with a formulation additionally containing a safening compound were only slightly injured.

(3) Two foliar spray formulations were prepared using the same carrier described in procedure (1) above.

Formulation P contained ⅓ pound DNCP.
Formulation Q contained ⅓ pound DNCP and ⅛ pound CMT.

Formulation P and Q were sprayed onto the foliage of grape plants. Injury tests were carried out in accordance with the method described in procedure (1) above. It can be seen from the following Table III that the foliage sprayed with the formulation containing a safening compound was only slightly injured.

TABLE III

| Formulation: | Injury |
|---|---|
| P | Severe. |
| Q | Slight. |

(4) Bean powdery mildew control tests were conducted to determine the effect of a safening agent on the biological activity of various dinitrophenol compounds. Eight foliar spray formulations were prepared. The carrier in each formulation was the same as described in procedure (1) above.

Formulation R contained 400 p.p.m. 2-i-bornyl-4,6-dinitrophenol (DNBP).
Formulation S contained 400 p.p.m. DNBP and 150 p.p.m CMT.
Formulation T contained 400 p.p.m. DNCP.
Formulation U contained 400 p.p.m. DNCP and 150 p.p.m. CMT.
Formulation V contained 400 p.p.m. dinitro(1-methylheptyl)phenyl crotonate) (DNPC).
Formulation W contained 400 p.p.m. DNPC and 150 p.p.m. CMT.
Formulation X contained 400 p.p.m. DNNP.
Formulation Y contained 400 p.p.m. DNNP and 150 p.p.m. CMT.

Each spray formulation was separately applied to a separate bean plant until the leaves of the plant were completely wetted. The foliage was dried and immediately subjected to ⅜ inch of artificial rainfall in a fog chamber. The foliage was then infected with the powdery mildew fungus *Erysiphe polygoni*. The infected foliage was then placed in the controlled environment of a greenhouse and maintained at about 20–25° C. for 10 days. The results of the powdery mildew control tests are given in Table IV below.

TABLE IV

| Formulation: | Percent control |
| --- | --- |
| R | 76 |
| S | 87 |
| T | 100 |
| U | 100 |
| V | 83 |
| W | 78 |
| X | 82 |
| Y | 77 |

It can be seen from Table IV that the addition of the safening agent to the fungicidal formulation did not substantially decrease the fungicidal activity of the dinitrophenol compounds. In the case of the formulation S, it can be seen that the addition of the safening agent enhanced the biological activity of DNBP.

(5) Additional powdery mildew control tests were carried out in accordance with the method described in procedure (4) above. Seven foliar spray formulations were prepared. Each formulation contained the same carrier as described in procedure (1) above and 400 p.p.m. DNBP.

Formulation Z consisted solely of the 400 p.p.m. DNBP and the carrier.

In addition to the carrier and DNBP,

Formulation AA contained 100 p.p.m. TIHB.
Formulation AB contained 100 p.p.m. CIHB.
Formulation AC contained 100 p.p.m. S–OCEDTC.
Formulation AD contained 100 p.p.m. TTC.
Formulation AE contained 100 p.p.m. BHMIH.
Formulation AF contained 100 p.p.m. ABMI.

The results of the tests measuring the percent control of powdery mildew on bean are given in Table V below.

TABLE V

| Formulation: | Percent control |
| --- | --- |
| Z | 76 |
| AA | 100 |
| AB | 100 |
| AC | 100 |
| AD | 99 |
| AE | 89 |
| AF | 70 |

It can be seen from Table V that in each instance the addition of the safening agent to the fungicidal formulation did not decrease the fungicidal activity of the dinitrophenol.

It is understood that changes and variations may be made without departing from the spirit and scope of the invention as defined by the appended claims.

What is claimed is:

1. A fungicidal composition comprising a fungicidally effective amount of a dinitrophenol or the acetate, crotonate, 3-methyl-2-butenoate or $C_1$–$C_6$ alkyl carbonate ester thereof having the formula:

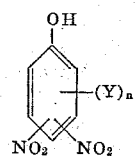

where $n$ is 1 or 2; and Y is selected from the group consisting of alkyl having up to 16 carbon atoms, with the proviso that when $n$ is 2, the two alkyl groups shall total no more than 24 carbon atoms; cycloalkyl from 3 to 6 carbon atoms; isobornyl; phenyl and benzyl; and the safening compound S-t-octylcresoxyethoxyethyl-N,N'-dimethylthiuronium chloride present in an amount sufficient to reduce the phytotoxic properties of the dinitrophenol, or its acetate, crotonate, 3-methyl-2-butenoate or $C_1$–$C_6$ alkyl carbonate ester.

2. A composition as defined in claim 1 wherein the weight ratio of safening compound to dinitrophenol, or acetate, crotonate, 3-methyl-2-butenoate or $C_1$–$C_6$ alkyl carbonate ester thereof, is from about 1:12 to about 3:1.

3. A composition as defined in claim 1 which additionally contains a carrier which comprises a mixture of methanol, acetone, water, and glycerine.

4. A method for reducing injury to crop plant tissues caused by the external application of fungicidal formulations containing a phytotoxic amount of a dinitrophenol, or the acetate, crotonate, 3-methyl-2-butenoate or $C_1$–$C_6$ alkyl carbonate ester thereof, which comprises applying to the loci to be protected a fungicidal composition containing as the fungicidal component a dinitrophenol, or the acetate, crotonate, 3-methyl-2-butenoate or $C_1$–$C_6$ alkyl carbonate ester thereof, and as a safening compound S-t-octylcresoxyethoxyethyl - N,N'-dimethylthiuronium chloride present in an amount suffiicent to reduce the phytotoxic properties of the fungicidal component.

5. A method as defined in claim 4 wherein the weight ratio of safening compound to dinitrophenol, or the acetate, crotonate, 3-methyl-2-butenoate or $C_1$–$C_6$ alkyl carbonate ester thereof, is from about 1:12 to about 3:1.

References Cited
UNITED STATES PATENTS

| 2,367,534 | 1/1945 | Smith et al. | 424—326 |
| 3,093,666 | 6/1963 | Du Brow | 260—564 E |
| 3,334,989 | 8/1967 | Imel et al. | 260—564 E |

ALBERT T. MEYERS, Primary Examiner

V. D. TURNER, Assistant Examiner

U.S. Cl. X.R.

424—248, 269, 273, 309, 326, 348